United States Patent
Lin

(10) Patent No.: US 9,804,340 B1
(45) Date of Patent: Oct. 31, 2017

(54) OPTICAL FIBER CONNECTOR CAPABLE OF SWITCHING CONNECTION POLARITY

(71) Applicant: Yu-Ching Lin, Kaohsiung (TW)

(72) Inventor: Yu-Ching Lin, Kaohsiung (TW)

( * ) Notice: Subject to any disclaimer, the term of this patent is extended or adjusted under 35 U.S.C. 154(b) by 0 days.

(21) Appl. No.: 15/467,249

(22) Filed: Mar. 23, 2017

(30) Foreign Application Priority Data

Dec. 1, 2016 (TW) .............................. 105139749 A

(51) Int. Cl.
*G02B 6/38* (2006.01)
(52) U.S. Cl.
CPC ......... *G02B 6/3831* (2013.01); *G02B 6/3821* (2013.01); *G02B 6/3825* (2013.01); *G02B 6/3882* (2013.01); *G02B 6/3893* (2013.01)
(58) Field of Classification Search
None
See application file for complete search history.

(56) References Cited

U.S. PATENT DOCUMENTS

| | | | |
|---|---|---|---|
| 9,323,007 B1* | 4/2016 | Yang | G02B 6/3825 |
| 2011/0044583 A1* | 2/2011 | Dalton | G02B 6/3825 385/53 |
| 2011/0229083 A1* | 9/2011 | Dainese Jnior | G02B 6/3869 385/74 |
| 2013/0230283 A1* | 9/2013 | Eberle | G02B 6/4471 385/78 |
| 2014/0219615 A1* | 8/2014 | Petersen | G02B 6/3817 385/88 |
| 2015/0355414 A1* | 12/2015 | Chen | G02B 6/3807 385/76 |
| 2015/0378112 A1* | 12/2015 | Marcouiller | G02B 6/3879 385/56 |
| 2016/0131857 A1* | 5/2016 | Pimentel | G02B 6/3825 385/78 |
| 2016/0259135 A1* | 9/2016 | Gniadek | G02B 6/3885 |

* cited by examiner

*Primary Examiner* — Thomas A Hollweg
*Assistant Examiner* — Erin Chiem
(74) *Attorney, Agent, or Firm* — Rosenberg, Klein & Lee

(57) ABSTRACT

An optical fiber connector according to the present disclosure includes an inner housing, a first outer housing and a second outer housing. The inner housing has a first wall, a second wall, a third wall and a fourth wall, wherein the first wall faces the third wall and connects with the second and fourth walls. The first outer housing is positioned to surround the inner housing. The second outer housing is positioned to surround the inner housing and engage the first outer housing. A key arm extends from the second outer housing and is configured to position on the first wall or the third wall of the inner housing. When the inner housing is inserted into an optical fiber adapter, the key arm is inserted into the key recess of the optical fiber adapter.

12 Claims, 19 Drawing Sheets

OPTICAL FIBER CONNECTOR CAPABLE OF SWITCHING CONNECTION POLARITY

RELATED APPLICATION

The present application is based on and claims priority to Taiwanese Application Number 105139749, filed Dec. 1, 2016, the disclosure of which is hereby incorporated by reference herein in its entirety.

BACKGROUND

1. Technical Field

The disclosure relates to an optical fiber connector, and more particularly, to an optical fiber connector capable of changing connection polarity.

2. Description of the Related Art

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of optical fiber connectors is to hold an optical fiber such that its core is axially aligned with the optical path of the device to which the connector is mating. This way the light from one fiber is optically coupled to the optical path of the mating device.

Reference is made to FIGS. 1a and 1b, which respectively illustrate conventional multi-fiber MPO male and female type connectors 110a, 110b. Each of the optical fiber connectors 100a and 100b has a rectangular key protrusion 112 formed on the upper surface of the front section thereof. Located on two opposing lateral surfaces of the front section are two indentations 114. A plurality of optical fibers 130 are exposed from and flush with the front end surface 120 of the front section. Two guide pins 140 protrude from the end surface 120 of the optical fiber connector 100a while two guide holes 150 are formed on the end surface 120 of the optical fiber connector 100b to respectively receive the guide pins 140 of the connector 100a.

In order to couple the optical fiber connectors 100a and 100b with each other, it needs to use a counterpart optical fiber adapter. Reference is made to FIG. 2, which illustrates a conventional MPO type optical fiber adapter 200. The optical fiber adapter 200 has a hollow main body with two opposing openings 210 in an axial direction into which the connectors 100a and 100b may be respectively inserted. To firmly mate with the connectors 100a and 100b, two pairs of hooks 220 are positioned to respectively extend out from the openings 210 of the adapter 200. In addition, two rectangular key recesses 230 are formed on the inner walls of the adapter 200 respectively near the openings 210 to receive the key protrusions 112 of the connectors 100a and 100b.

When the connectors 100a and 100b are respectively inserted into the adapter 200 through the openings 210 to couple with each other, the hooks 220 will respectively hook on to the connectors 100a, 100b at the indentations 114. The guide pins 140 of the connector 100a are respectively inserted into the guide holes 150 of the connector 100b and the optical fibers 130 exposed out from the connectors 100a and 100b are brought into contact with each other accordingly. This way the light from one fiber may be optically coupled to the coupled fiber.

The function of the key recesses 230 is to receive the key protrusions 112 at the connectors 100a, 100b such that the connectors 100a, 100b may be inserted into the adapter 200 with only predetermined orientations. As illustrated in FIG. 2, when the connector 100a or 100b of FIGS. 1a, 1bis positioned with its key protrusion 112 being oriented up, it cannot be inserted into the adapter 200 through the openings 210. When the connector 100a or 100b is turned over such that the key protrusion 112 is oriented down, it may be inserted into the adapter 200. Therefore, the orientations of the key recesses 230 restrict the coupling of the connectors 100a and 100b to the predetermined polarity.

However, it is necessary to change the coupling polarity of the connectors for some applications.

SUMMARY

The present disclosure provides an optical fiber connector capable of changing connection polarity.

In one embodiment, the optical fiber connector of the present disclosure includes a hollow inner housing, a first outer housing and a second outer housing. The inner housing has a first wall, a second wall, a third wall and a fourth wall, wherein the first wall faces the third wall and connects with the second and fourth walls. The first outer housing is attached to the inner housing. The second outer housing is detachably coupled to the first outer housing and detachably attached to the inner housing. The second outer housing includes a key arm, wherein the second outer housing is detachably attached to the inner housing by positioning the key arm selectively on the first wall or the third wall such that the key arm is inserted into a key recess formed within an optical fiber adapter when the inner housing is inserted into the optical fiber adapter.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 3:
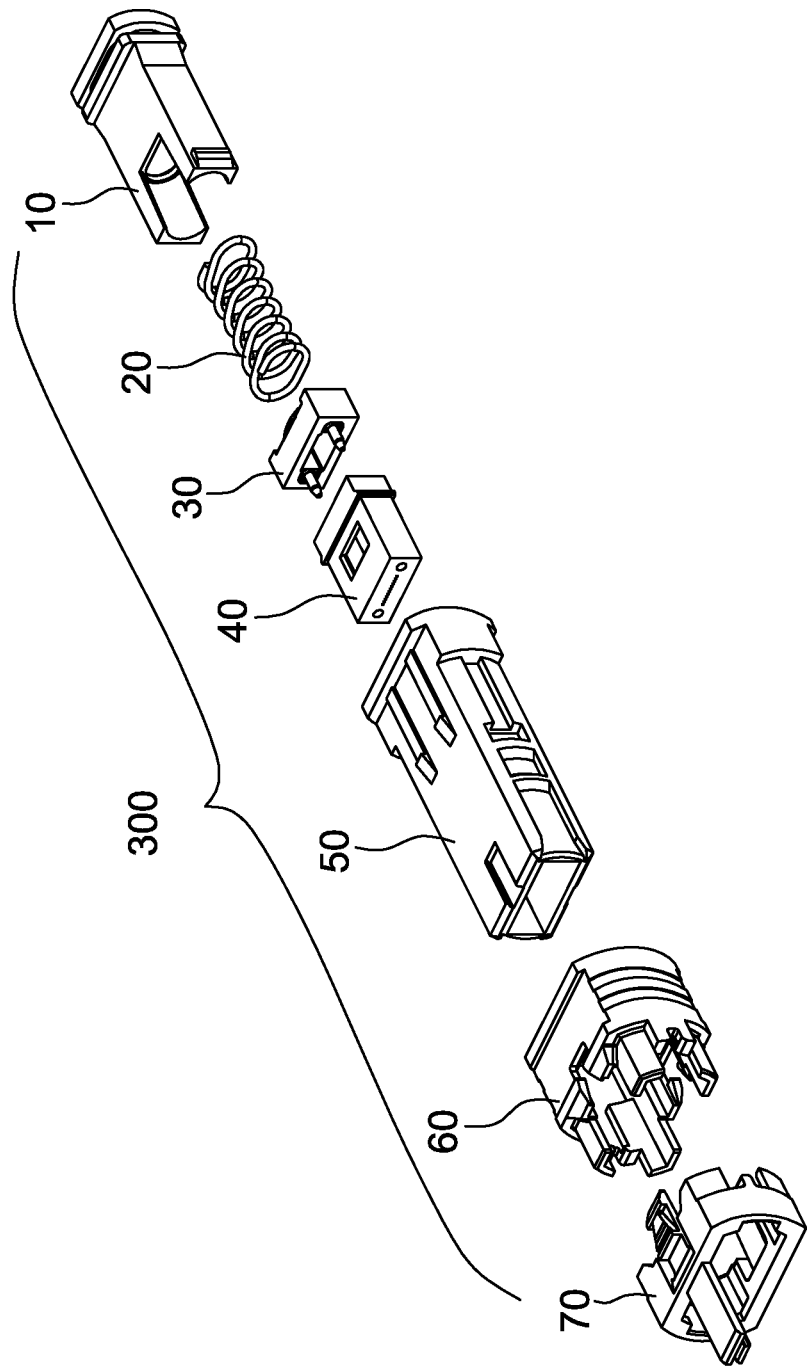
FIG. 3 is an exploded view of the optical fiber connector of the present disclosure.

Reference is made to FIG. 3, the optical fiber connector 300 according to the present disclosure may be an MPO type optical fiber connector and includes a spring push 10, a spring 20, a spring seat 30, a ferrule 40, an inner housing 50, a first outer housing 60 and a second outer housing 70.

Figure 4A:
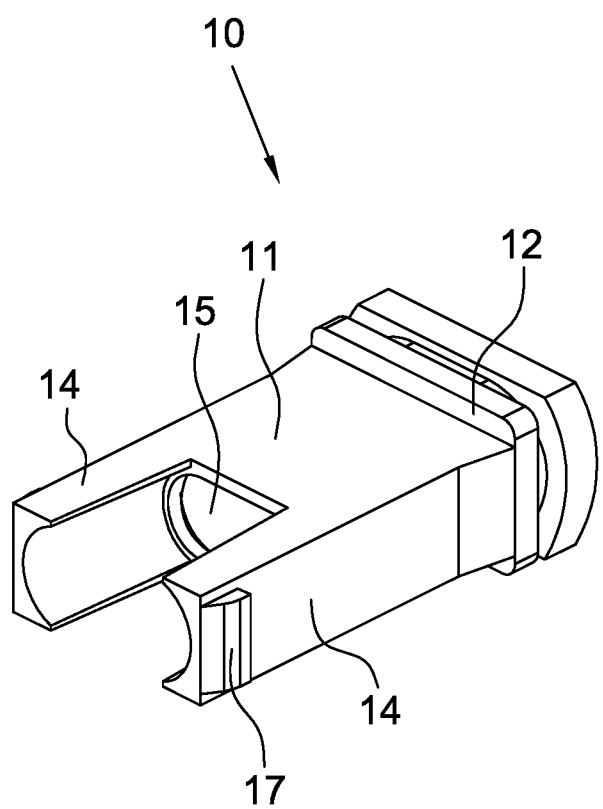
FIG. 4a is an elevated perspective view of the spring push of the optical fiber connector of the present disclosure.
Figure 4B:
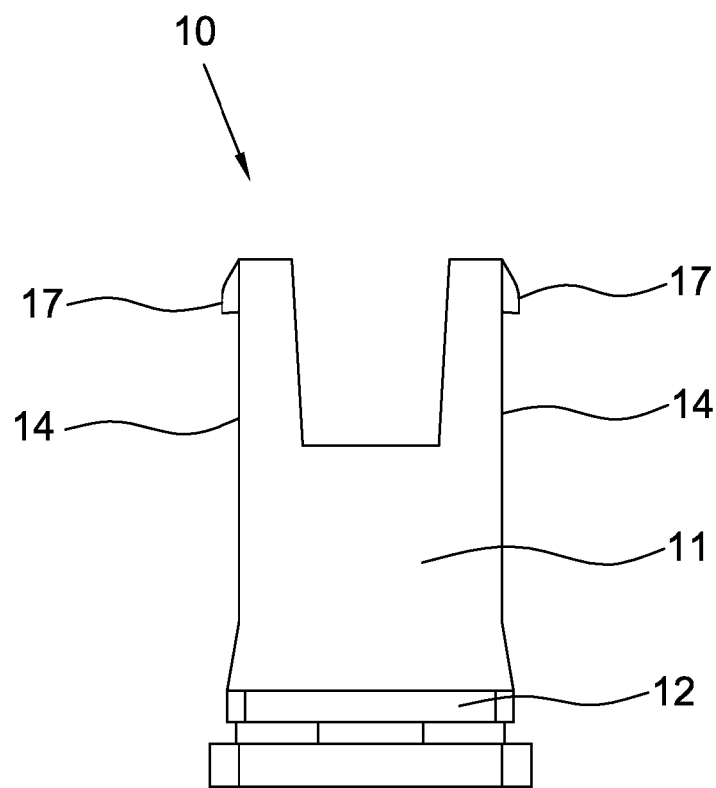
FIG. 4b is a side view of the spring push of the optical fiber connector of the present disclosure.
Figure 4C:
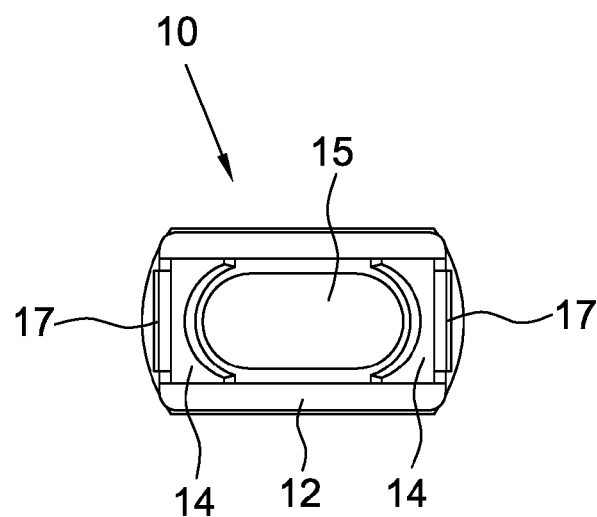
FIG. 4c is another side view of the spring push of the optical fiber connector of the present disclosure.

Reference is now made to FIGS. 4a to 4c, which illustrate the spring push 10 of the present disclosure. The spring push 10 may be constructed of plastics by an injection molding process and include a forward portion 11 and a flange 12. The flange 12 is hollow and substantially has a rectangular shape in cross section. The forward portion 11 extends forward from the flange 12 in a lengthwise or axial direction. Two flexible arms 14 provided on the spring push 10 depend lengthwise from the forward portion 11. An opening 15 extends lengthwise through the spring push 10 from the flange 12 to the forward portion 11. Engagement protrusions 17 are respectively formed on outer surfaces of the flexible arms 14.

Figure 5:
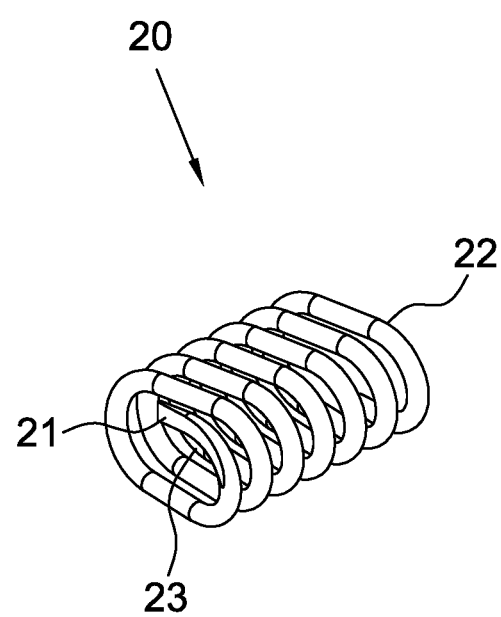
FIG. 5 is an elevated perspective view of the spring of the optical fiber connector of the present disclosure.

Reference is now made to FIG. 5, the spring 20 may be a coil spring and extend lengthwise. The spring 20 has a front end 21 and a rear end 22. An opening 23 extends lengthwise through the spring 20 from the rear end 22 to the front end 21 and comes in communication with the opening 15 of the spring push 10 when the spring 20 is, at its rear end 22, brought into contact with the forward portion 11 of the spring push 10.

Figure 6A:
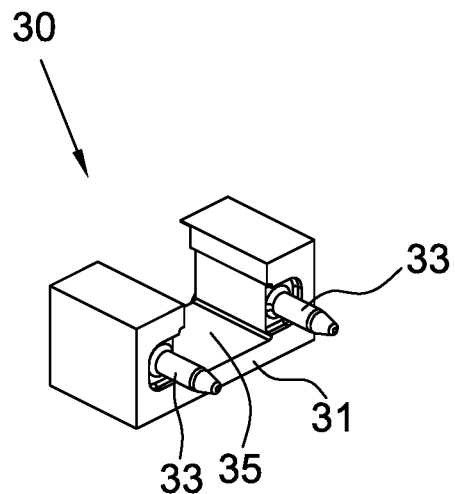
FIGS. 6a to 6c are different elevated perspective views of the spring seat of the optical fiber connector of the present disclosure.
Figure 6B:
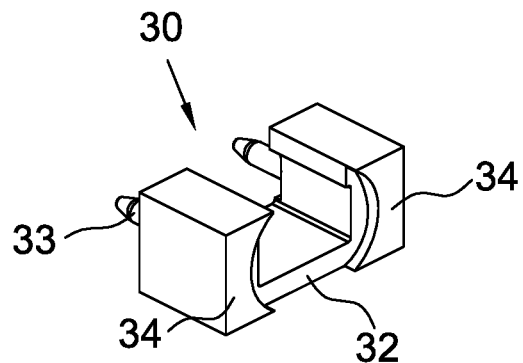
Figure 6C:
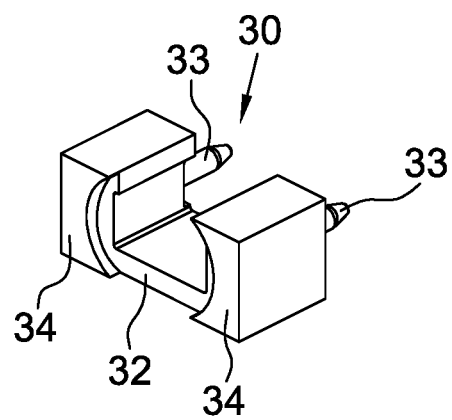

Reference is now made to FIGS. 6a to 6c, which illustrate the spring seat 30 of the present disclosure. The spring seat 30 may be constructed of plastics by an injection molding process and include a body substantially having a U-shaped cross section. The spring seat 30 has a front surface 31 and an opposed rear surface 32. A pair of guide pins 33 extends lengthwise or axially from the front surface 31 and a pair of restricting walls 34 extends backward from the rear surface 32. The two restricting walls 34 are positioned to face each other and the inner side surfaces thereof are curved and concave. A rectangular opening 35 extends lengthwise through the spring seat 30 from the rear surface 32 to the front surface 31.

Figure 7A:
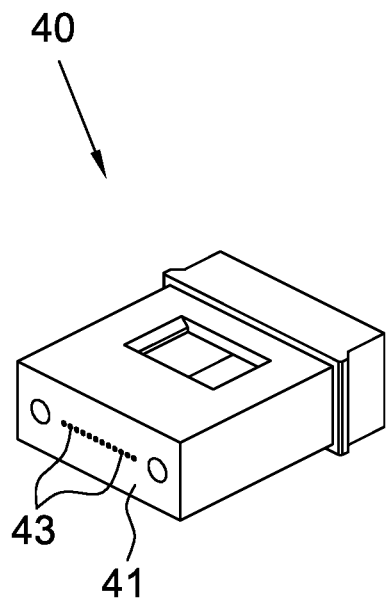
FIG. 7a is an elevated perspective view of the ferrule of the optical fiber connector of the present disclosure.
Figure 7B:
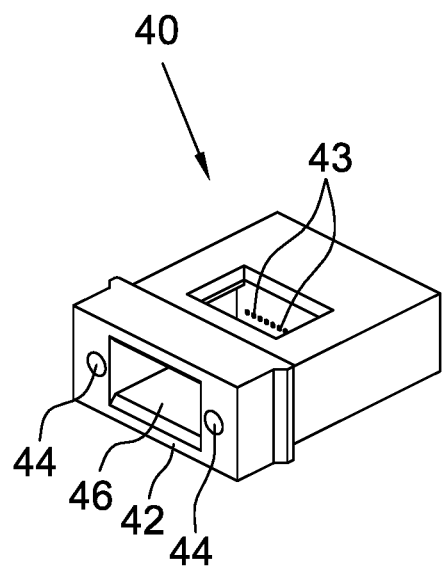
FIG. 7b is another elevated perspective view of the ferrule of the optical fiber connector of the present disclosure.

Reference is now made to FIGS. 7a and 7b, which illustrate the ferrule 40 of the present disclosure. The ferrule 40 may be an MT-type multi-fiber ferrule and substantially have a rectangular shape in cross section. The ferrule 40 has a body extending lengthwise and opposing front and rear surfaces 41, 42. Two circular holes 44 open through the rear surface 42 and are configured to respectively receive the guide pins 33 of the spring seat 30. A rectangular opening 46 is formed through the rear surface 42 and located between the holes 44. The opening 46 extends lengthwise from the rear surface 42 toward the front surface 41. The ferrule 40 defines a plurality of bores 43 that open through the front surface 41 and are in communication with the opening 46. The bores 43 are arranged in a laterally extending linear row for receiving the end portions of respective optical fibers of a ribbon fiber that can be inserted into the opening 46 from the rear surface 42.

Figure 8A:
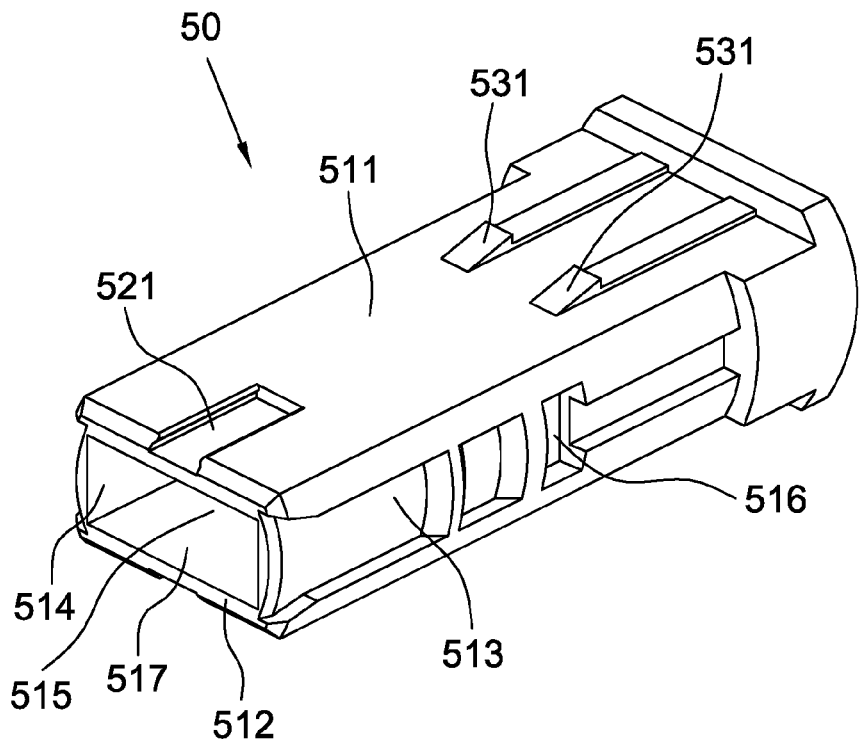
FIG. 8a is an elevated perspective view of the inner housing of the optical fiber connector of the present disclosure.
Figure 8B:
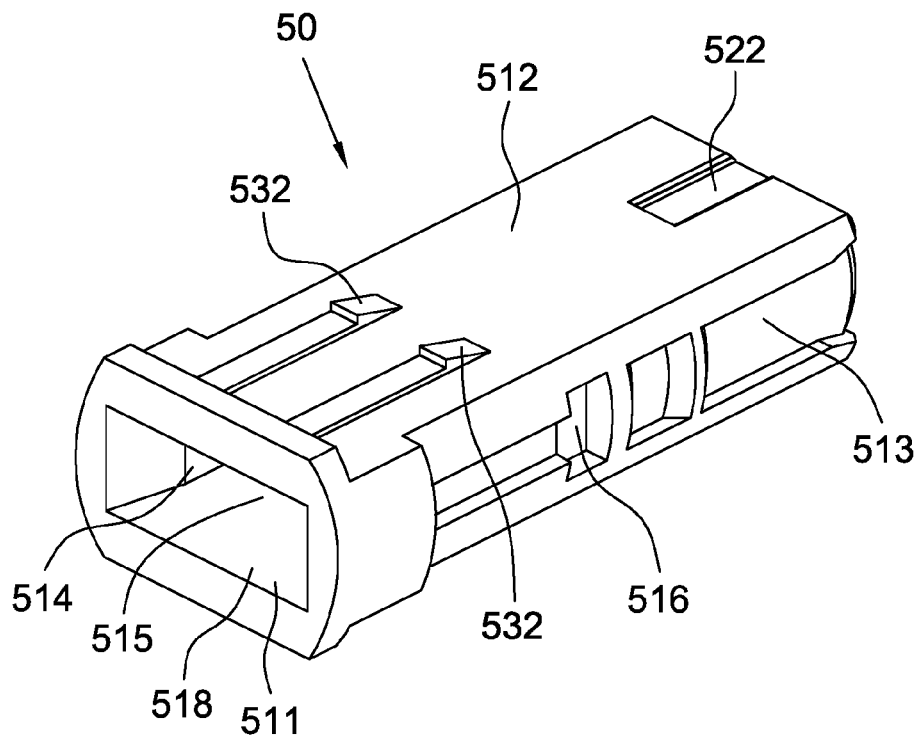
FIG. 8b is another elevated perspective view of the inner housing of the optical fiber connector of the present disclosure.
Figure 9A:
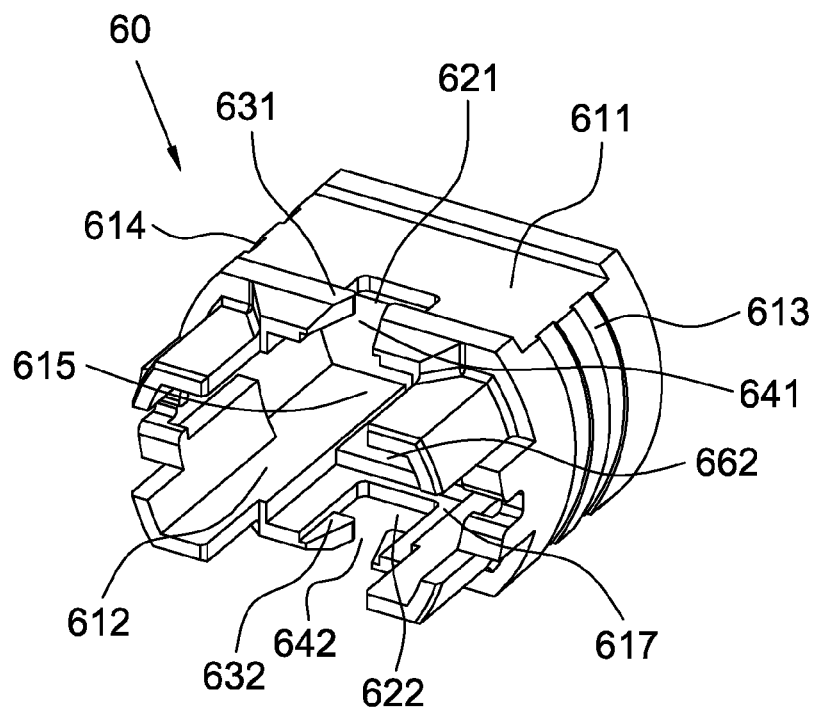
FIGS. 9a to 9d are different elevated perspective views of the first outer housing of the optical fiber connector of the present disclosure.
Figure 9B:
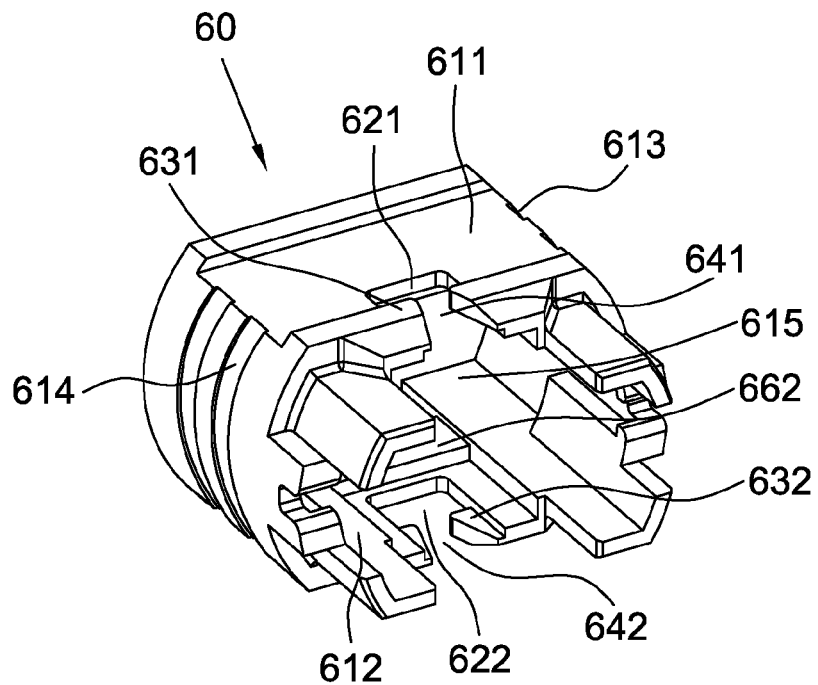
Figure 9C:
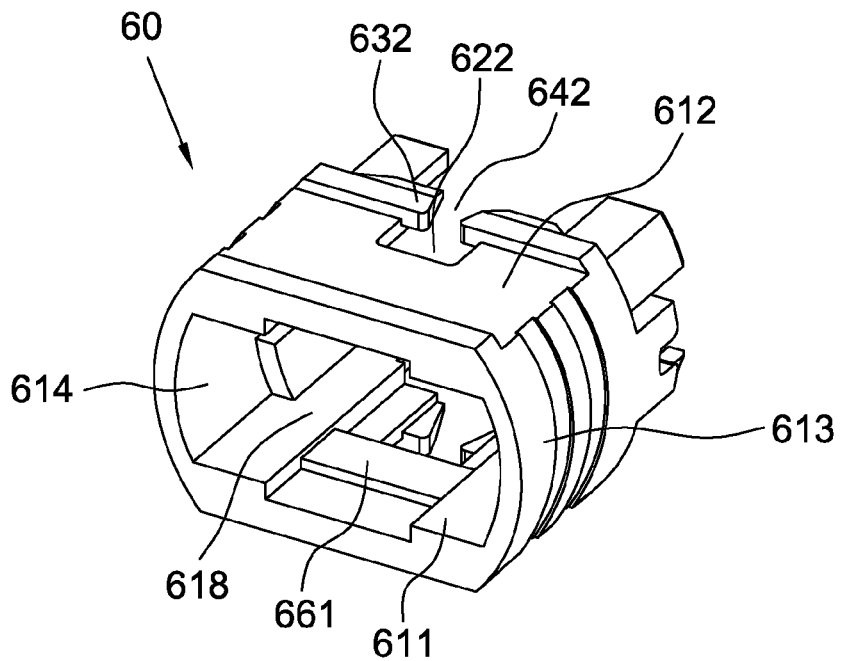
Figure 9D:
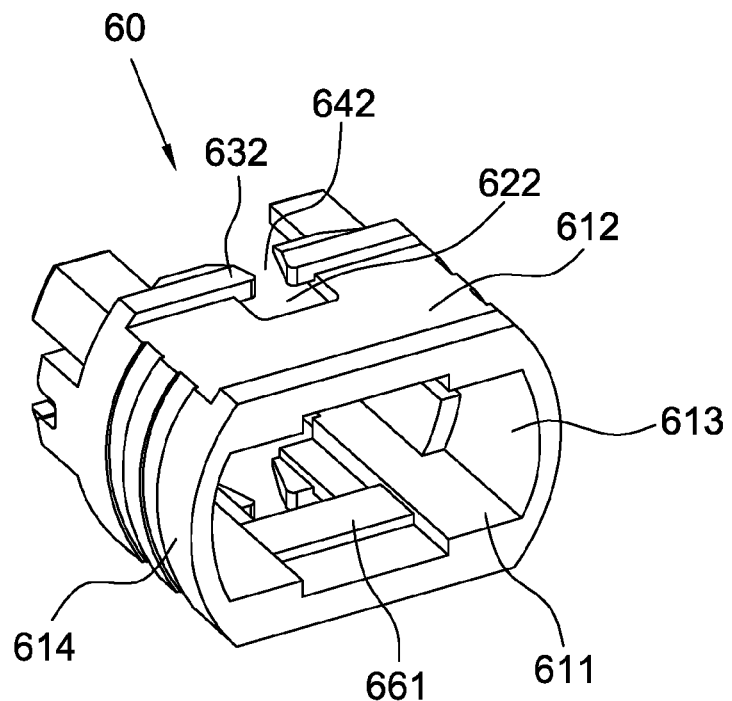
Figure 9E:
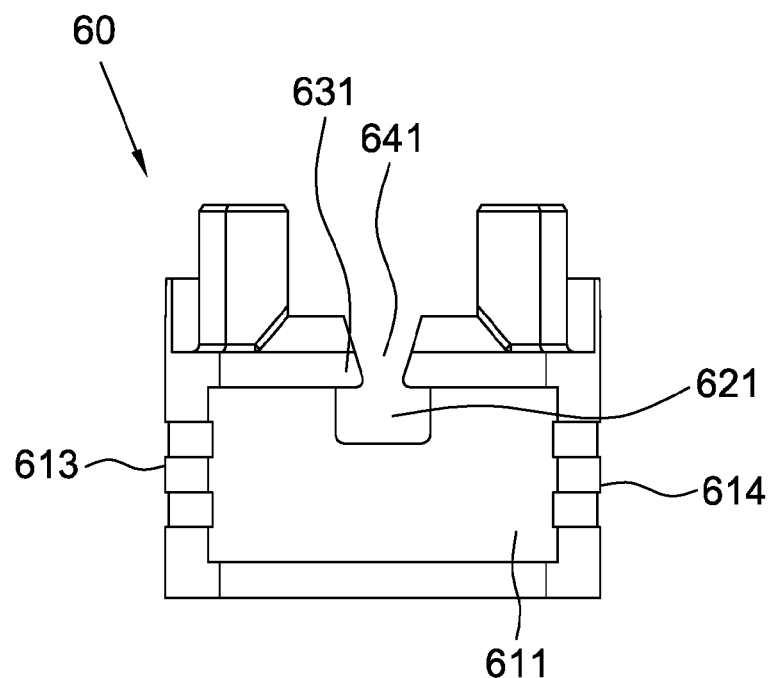
FIGS. 9e to 9h are different side views of the first outer housing of the optical fiber connector of the present disclosure.
Figure 9F:
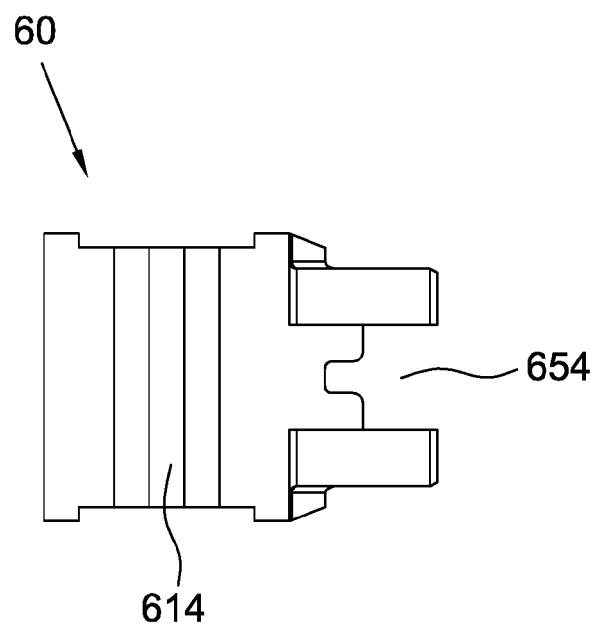
Figure 9G:
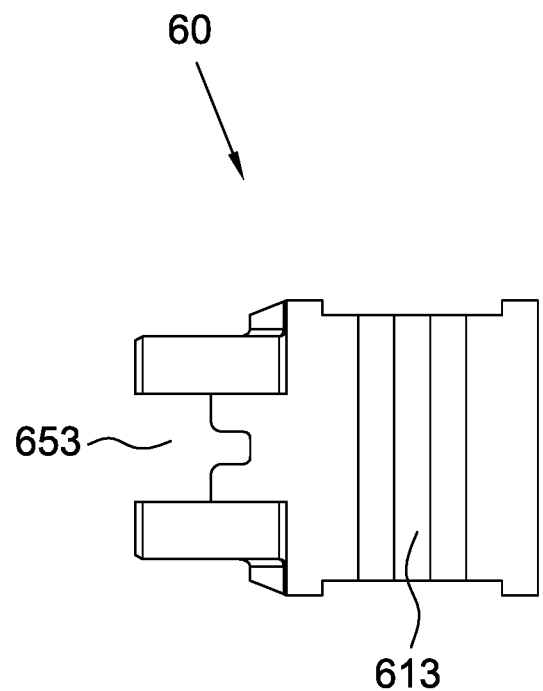
Figure 9H:
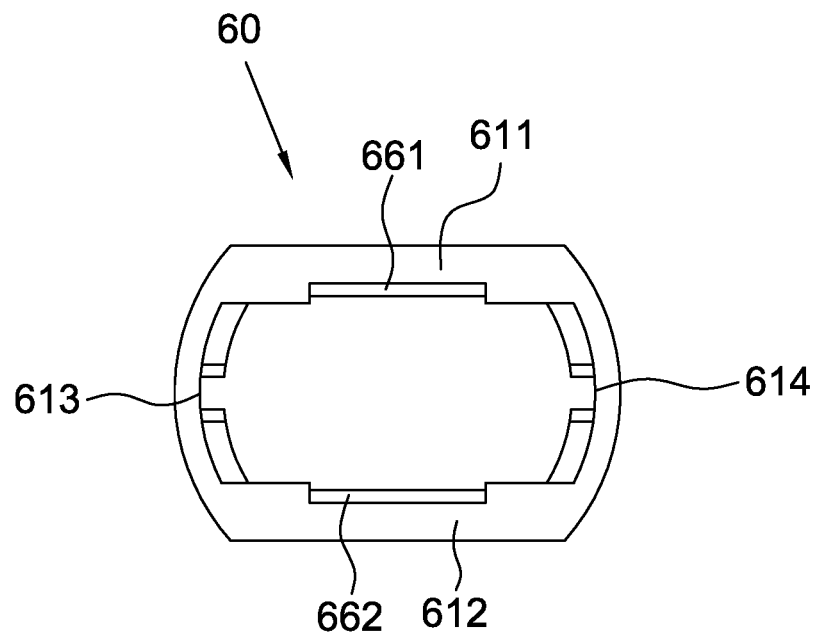
Figure 10A:
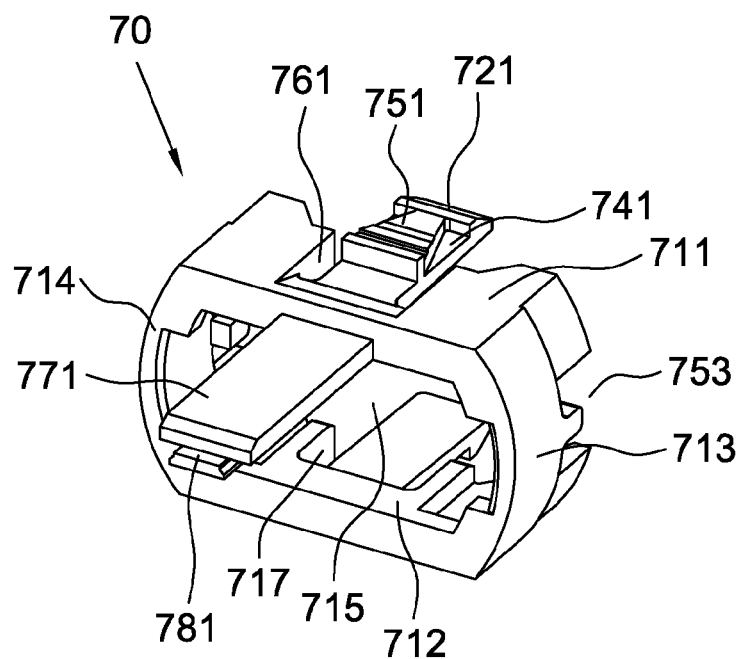
FIGS. 10a to 10d are different elevated perspective views of the second outer housing of the optical fiber connector of the present disclosure.
Figure 10B:
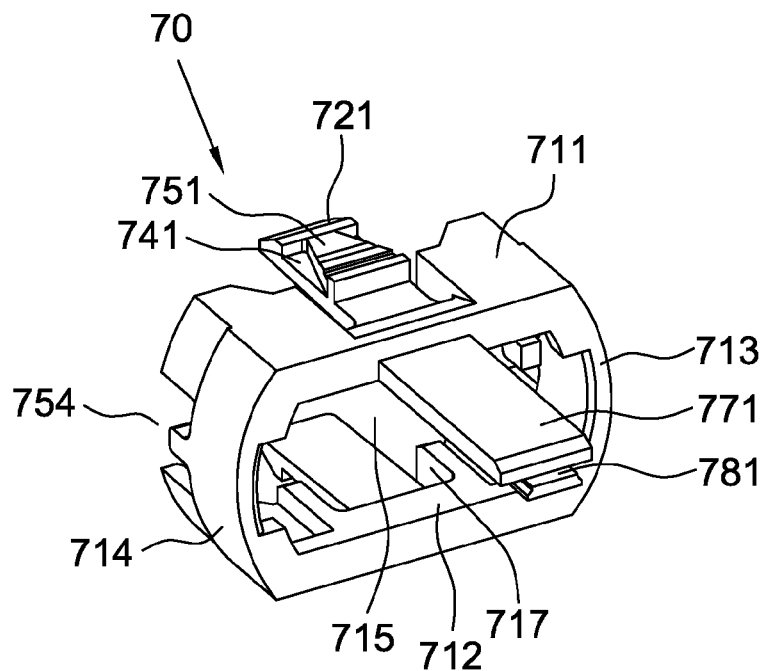
Figure 10C:
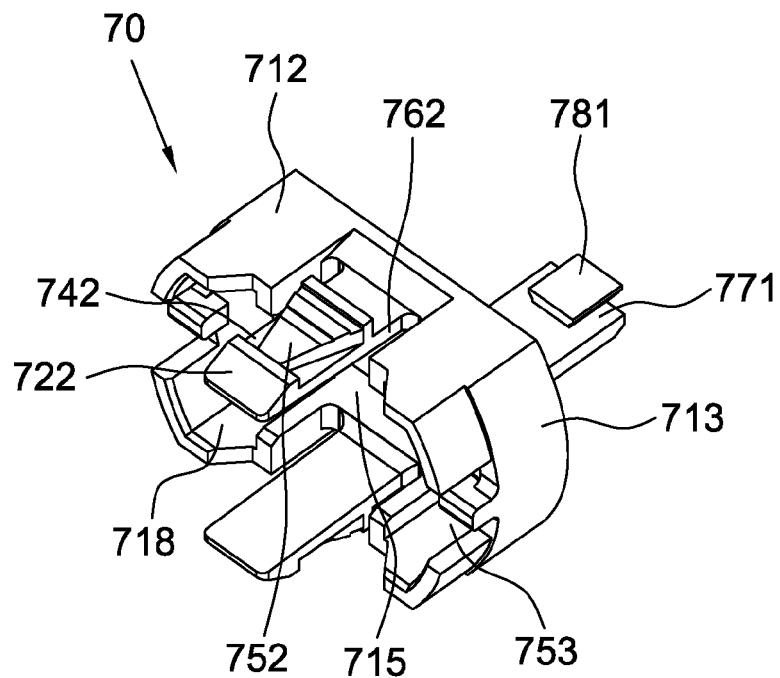
Figure 10D:
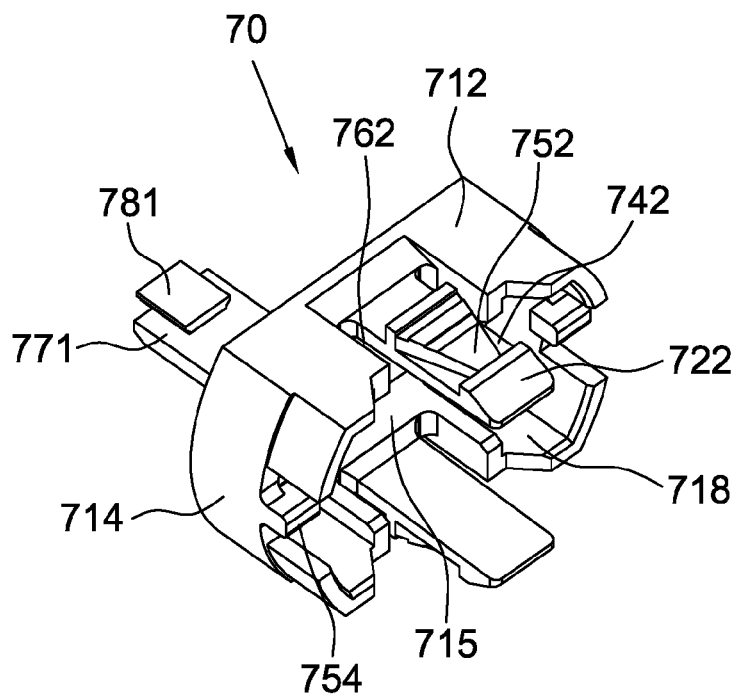
Figure 10E:
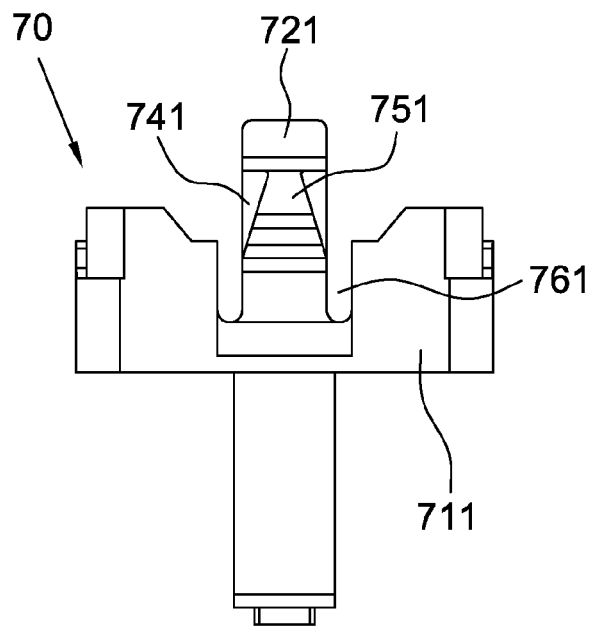
FIG. 10e is a side view of the second outer housing of the optical fiber connector of the present disclosure.
Figure 10F:
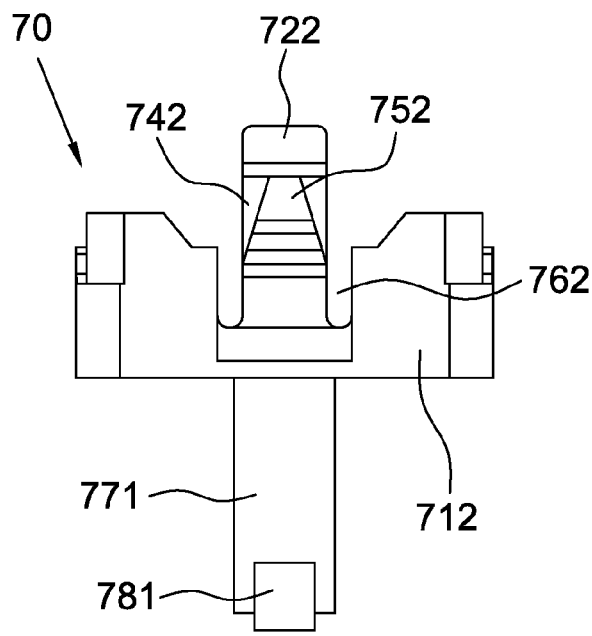
FIG. 10f is another side view of the second outer housing of the optical fiber connector of the present disclosure.

Reference is now made to FIGS. 8a and 8b, which illustrate the inner housing 50 of the present disclosure. The inner housing 50 may be constructed of plastics by an injection molding process. The inner housing 50 is hollow and substantially has a rectangular shape in cross section. The inner housing 50 extends lengthwise or axially and has an accommodation room 515 defined by a top wall 511, a bottom wall 512, a right wall 513 and a left wall 514, wherein the top wall 511 faces the bottom wall 512 and connects with the right wall 513 and left wall 514. The accommodation room 515 has a front opening 517 and an opposed rear opening 518 in the lengthwise or axial direction. Engagement openings 516 are respectively formed through the right wall 513 and the left wall 514 for engaging the engagement protrusions 17 of the spring push 10. Two elongated grooves 521 and 522 are formed near the front opening 517 on outer surfaces of the top wall 511 and bottom wall 512 respectively. The grooves 521, 522 may be dovetail grooves and are positioned corresponding to each other. The grooves 521, 522 extend lengthwise or axially to the front edges of the top and bottom walls 511, 512 respectively. In addition, stop blocks 531 and 532 are respectively formed on the outer surfaces of the top wall 511 and bottom wall 512. The stop blocks 531 and 532 define respective angled or ramped outer surfaces, which are ramped up toward the rear edges of the top and bottom walls 511 and 512 respectively. In one embodiment, two stop blocks 531 are provided on the top wall 511 and two stop blocks 532 are provided on the bottom wall 512.

Reference is now made to FIGS. 9a to 9h, which illustrate the first outer housing 60 of the present disclosure. The first outer housing 60 may be constructed of plastics by an injection molding process. The first outer housing 60 is hollow and extends lengthwise or axially. The first outer housing 60 has an accommodation room 615 defined by a top wall 611, a bottom wall 612, a right wall 613 and a left wall 614, wherein the top wall 611 faces the bottom wall 612 and connects with the right wall 613 and left wall 614. The accommodation room 615 has a front opening 617 and an opposed rear opening 618 in the lengthwise or axial direction. An engagement portion 621 is provided on the top wall 611. The engagement portion 621 may be a rectangular accommodation opening formed through the top wall 611 from inside to outside the accommodation room 615. A stop block 631 abuts the front edge of the top wall 611 and is located in front of the accommodation opening 621. A break 641 extends lengthwise through the stop block 631 and gradually becomes wider from the accommodation opening 621 to the front edge of the top wall 611 such that the accommodation opening 621 is in communication with the front edge of the top wall 611 through the break 641. Similarly, an engagement portion 622 is provided on the bottom wall 612. The engagement portion 622 may be a rectangular accommodation opening formed through the bottom wall 612 from inside to outside the accommodation room 615. A stop block 632 abuts the front edge of the bottom wall 612 and is located in front of the accommodation opening 622. A break 642 extends lengthwise through the stop block 632 and gradually becomes wider from the accommodation opening 622 to the front edge of the bottom wall 612 such that the accommodation opening 622 is in communication with the front edge of the bottom wall 612 through the break 642. In addition, engagement portions 653 and 654 are respectively provided on the right wall 613 and the left wall 614. The respective engagement portions 653, 654 may be a projection, a slot or combinations thereof. Rectangular projections 661 and 662 are respectively provided on the top wall 611 and the bottom wall 612 within the accommodation room 615.

Reference is now made to FIGS. 10a to 10f, which illustrate the second outer housing 70 of the present disclosure. The second outer housing 70 may be constructed of plastics by an injection molding process. The second outer housing 70 is hollow and extends lengthwise or axially. The second outer housing 70 has an accommodation room 715 defined by a top wall 711, a bottom wall 712, a right wall 713 and a left wall 714, wherein the top wall 711 faces the bottom wall 712 and connects with the right wall 713 and left wall 714. The accommodation room 715 has a front opening 717 and an opposed rear opening 718 in the lengthwise or axial direction. The top wall 711 is formed with a slot extending in the lengthwise or axial direction, which defines a rectangular break 761. An engagement arm 741 is formed within the break 761 and protrudes out of the break 761 in the axial direction from the top wall 711 toward the rear opening 718. An engagement portion 721 is provided on the rear end of the outer surface of the engagement arm 741 for engaging the engagement portion 621 or 622 of the first outer housing 60. The engagement portion 721 may be an engagement projection for being positioned within the accommodation opening 621 or 622. The engagement projection 721 defines an angled or ramped outer surface, which is sloped down toward the rear end of the engagement arm 741. In addition, a press projection 751 is provided on the outer surface of the engagement arm 741. The press projection 751 extends lengthwise or axially from the engagement projection 721 and gradually becomes wider. Parts of the press projection 751 may be positioned within the break 641 or 642. The bottom wall 712 is formed with a slot extending in the lengthwise or axial direction, which defines a rectangular break 762. An engagement arm 742 is formed within the break 762 and protrudes out of the break 762 in the axial direction from the bottom wall 712 toward the rear opening 718. An engagement portion 722 is provided on the rear end of the outer surface of the engagement arm 742 for engaging the engagement portion 621 or 622 of the first outer housing 60. The engagement portion 722 may be an engagement projection for being positioned within the accommodation opening 621 or 622. The engagement projection 722 defines an angled or ramped outer surface, which is sloped down toward the rear end of the engagement arm 742. In addition, a press projection 752 is provided on the outer surface of the engagement arm 742. The press projection 752 extends lengthwise or axially from the engagement projection 722 and gradually becomes wider. Parts of the press projection 752 may be positioned within the break 641 or 642. A key arm 771 extends from the top wall 711 lengthwise or axially and backward to the engagement arm 741. A restricting block 781 is provided on the inner surface of the key arm 771 for inserting into the grooves 521 and 522 on the inner housing 50 from the respective front edges thereof. The restricting block 781 may move lengthwise or axially in the grooves 521 and 522 but fails to be taken out directly upward from the groove 521 or 522. In addition, engagement portions 753 and 754 are respectively provided on the right wall 713 and the left wall 714. The respective engagement portions 753, 754 may be a projection, a slot or combinations thereof. The engagement portions 753 and 754 have shapes corresponding to respective shapes of the engagement portions 653 and 654 such that the engagement portions 753 and 754 may respectively engage the engagement portions 653 and 654. Furthermore, the engagement portions 753 and 754 have their shapes also corresponding to the respective shapes of the engagement portions 654 and 653 such that the engagement portions 753 and 754 may respectively engage the engagement portions 654 and 653.

Figure 11:
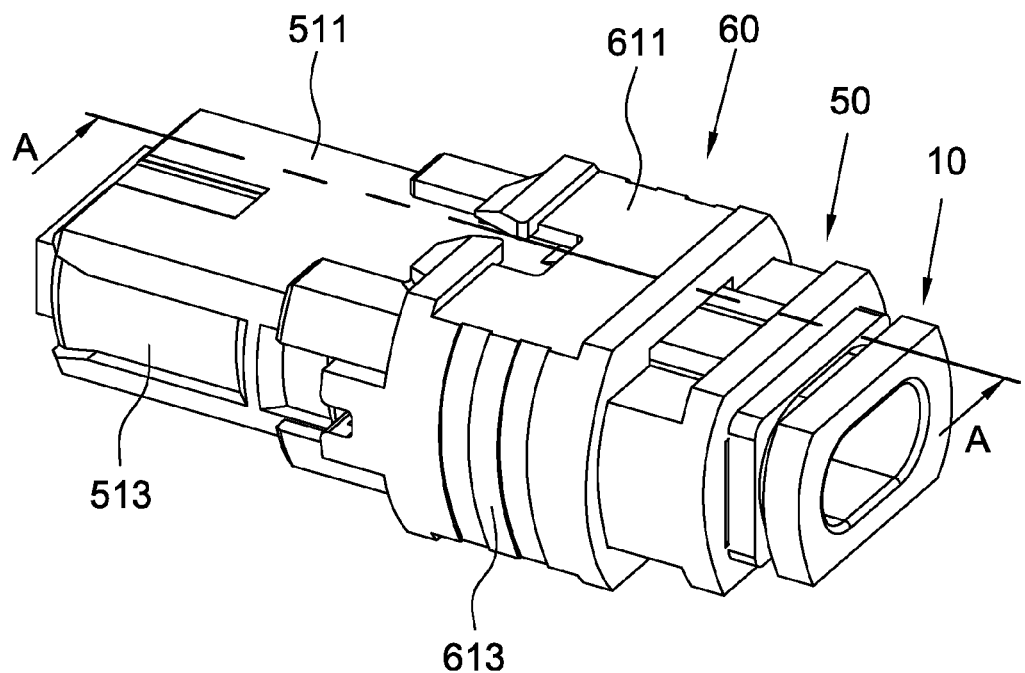
FIG. 11 illustrates that the spring push, spring, spring seat, ferrule, inner housing and first outer housing of the optical fiber connector of the present disclosure are assembled together.
Figure 12:
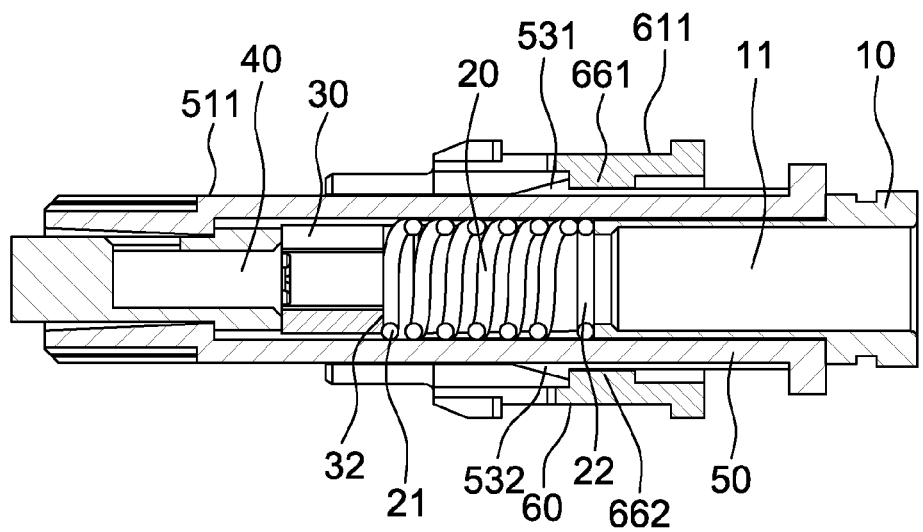
FIG. 12 is a cross-sectional view taken along line A-A of FIG. 11.

Reference is now made to FIGS. 11 and 12, the flange 12 of the spring push 10 has a front end surface that is brought into contact with the rear end surface of the inner housing 50 according to the optical fiber connector of the present disclosure. The flexible arms 14 are inserted into the accommodation room 515 of the inner housing 50 from the rear opening 518 and the engagement protrusions 17 of the flexible arms 14 are brought into engagement with the respective engagement openings 516 accordingly. The spring push 10 comes in contact with the rear end 22 of the spring 20 with the forward portion 11 thereof and pushes the spring 20 forward toward the spring seat 30 to have the front end 21 of the spring 20 press upon the rear surface 32 of the spring seat 30. At this state the guide pins 33 extending from the front surface 31 of the spring seat 30 are inserted into the respective holes 44 on the rear surface 42 of the ferrule 40. The ferrule 40 is pushed into the inner housing 50 by the spring 20 and the front surface 41 thereof protrudes from the front opening 517. In addition, the inner housing 50 is inserted into the accommodation room 615 of the first outer housing 60 from the rear opening 618 and protrudes from the front opening 617 such that the grooves 521 and 522 are exposed out of the first outer housing 60. During the insertion of the inner housing 50 the projections 661, 662 of the first outer housing 60 respectively slide on the ramped outer surfaces of the stop blocks 531, 532 on the inner housing 50. When the inner housing 50 continues to be pushed, the projections 661, 662 finally move past the respective stop blocks 531, 532. At this state the top wall 511 and bottom wall 512 of the inner housing 50 come to being positioned to directly face the top wall 611 and bottom wall 612 of the first outer housing 60 respectively.

Figure 1A:
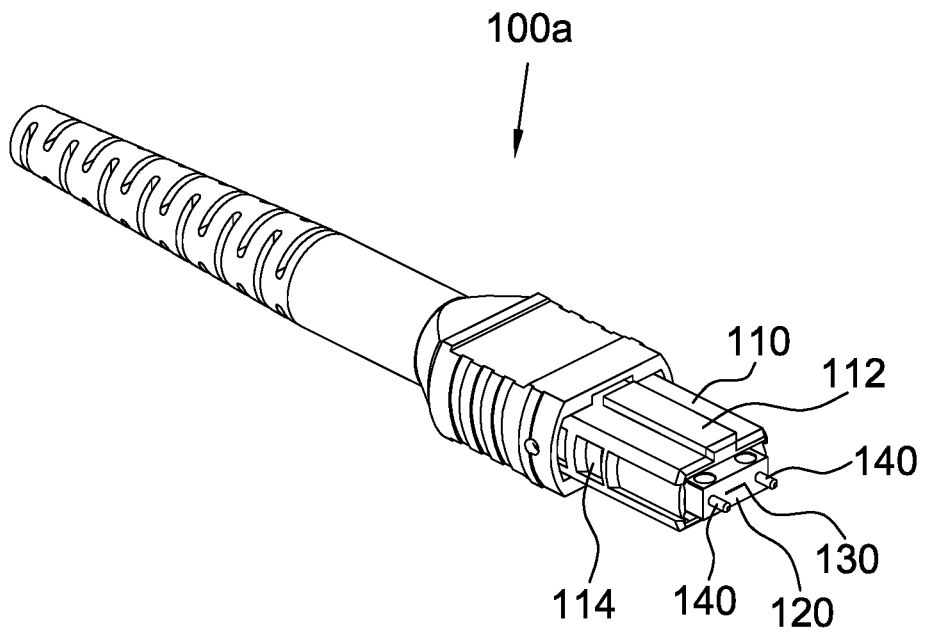
FIG 1a is an elevated perspective view of a conventional MPO male type optical fiber connector.
Figure 1B:
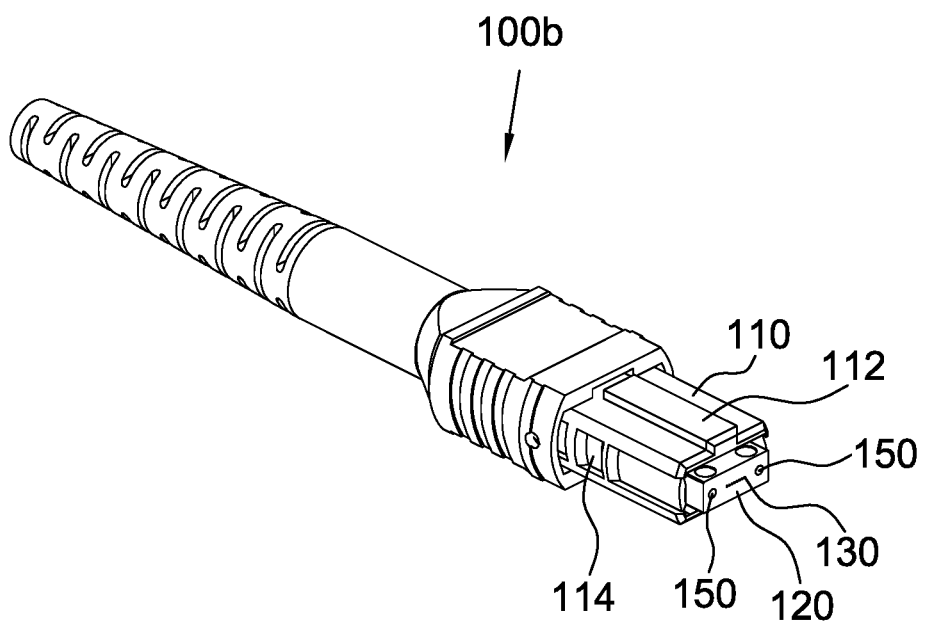
FIG 1b is an elevated perspective view of a conventional MPO female type optical fiber connector.

After the inner housing 50 is inserted into the first outer housing 60, the second outer housing 70 is then coupled to the first outer housing 60. Specifically, referring to FIGS. 13 and 14, the inner housing 50 is inserted into the second outer housing 70 from the rear opening 718 and the engagement portions 721, 722 of the second outer housing 70 respectively engage the engagement portions 621, 622 of the first outer housing 60 and the engagement portions 753, 754 respectively engage the engagement portions 653, 654. The way to engage the engagement portion 721 with the engagement portion 621 is to press down the press projection 751 when the second outer housing 70 moves toward the first outer housing 60. Similarly, the way to engage the engagement portion 722 with the engagement portion 622 is to press down the press projection 752 when the second outer housing 70 moves toward the first outer housing 60. Since a large enough clearance is present between the engagement arm 741 of the second outer housing 70 and the top wall 511 of the inner housing 50 and another large enough clearance is present between the stop block 631 of the first outer housing 60 and the top wall 511, the engagement portion 721 may slide on the outer surface of the top wall 511 and move through these two clearances when the press projection 751 is pressed down and the second outer housing 70 moves toward the first outer housing 60. Similarly, there exists a large enough clearance between the engagement arm 742 of the second outer housing 70 and the bottom wall 512 of the inner housing 50 and another large enough clearance between the stop block 632 of the first outer housing 60 and the bottom wall 51 to allow the engagement portion 722 to pass therethrough when the press projection 752 is pressed down and the second outer housing 70 moves toward the first outer housing 60. When the second outer housing 70 continues to move toward the first outer housing 60, the engagement portions 721, 722 finally move past the respective stop blocks 631, 632. At this moment the engagement arms 741, 742 spring up as a result of elasticity and the engagement projections 721, 722 fall into and engage the respective accommodation openings 621, 622 accordingly. In addition, parts of the press projections 751 and 752 of the second outer housing 70 are respectively positioned in the breaks 641 and 642. Furthermore, when the engagement portions 721, 722 respectively engage the engagement portions 621, 622, the engagement portions 753, 754 of the second outer housing 70 will respectively engage the engagement portions 653, 654 of the first outer housing 60. When the second outer housing 70 is prepared to couple to the first outer housing 60, the restricting block 781 of the second outer housing 70 is inserted into the groove 521 on the inner housing 50 from its front edge. The key arm 771 is positioned on the top wall 511 of the inner housing 50 and above the groove 521 to function as the key protrusion accordingly. The key arm 771 on the inner housing 50 has the function the same as that of the key protrusion 112 of the connector 100a or 100b as illustrated in FIG 1a or 1b.

Figure 2:
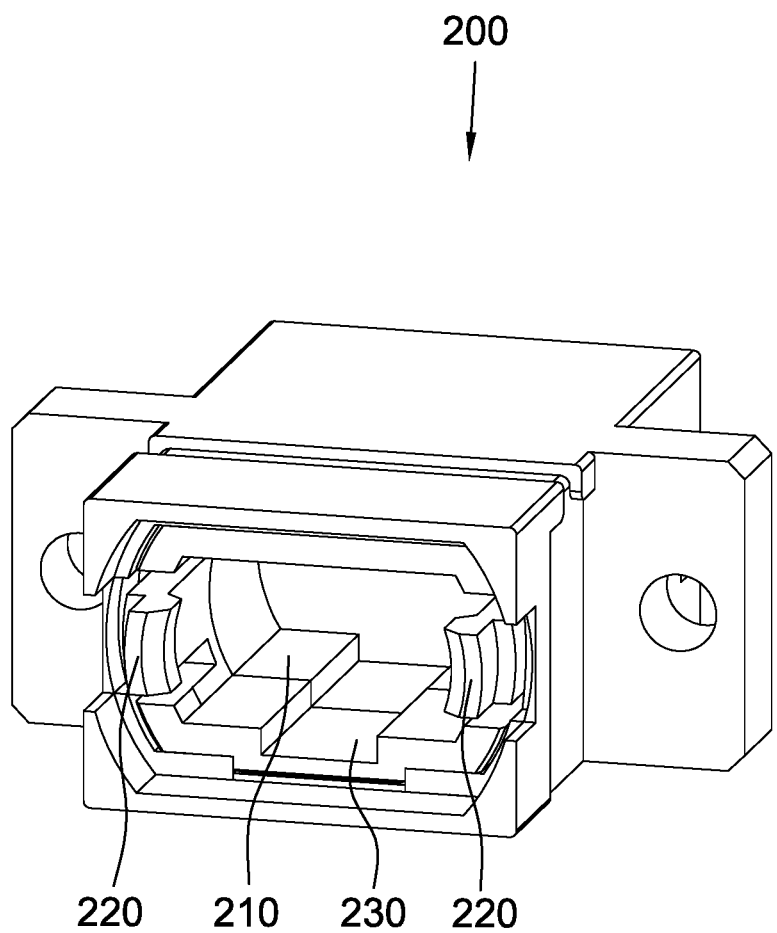
FIG. 2 is an elevated perspective view of a conventional MPO type optical fiber adapter.

In the optical fiber connector 300 of the present disclosure a ribbon fiber (not shown) may go through the spring push 10, spring 20 and spring seat 30 and then insert into the ferrule 40 from the opening 46. The bores 43 on the front surface 41 of the ferrule 40 receive the end portions of the respective optical fibers of the ribbon fiber and these end portions of the optical fibers are flush with the front surface 41 of the ferrule 40. The optical fiber connector 300 of the present disclosure may be inserted into a counterpart adapter and the counterpart adapter may be a known optical fiber adapter, for example, the optical fiber adapter 200 of FIG. 2. The optical fiber connector 300 of the present disclosure may couple with another optical fiber connector of the same type, for example, the optical fiber connector 100a or 100b of FIG. 1a or 1b.

Figure 13:
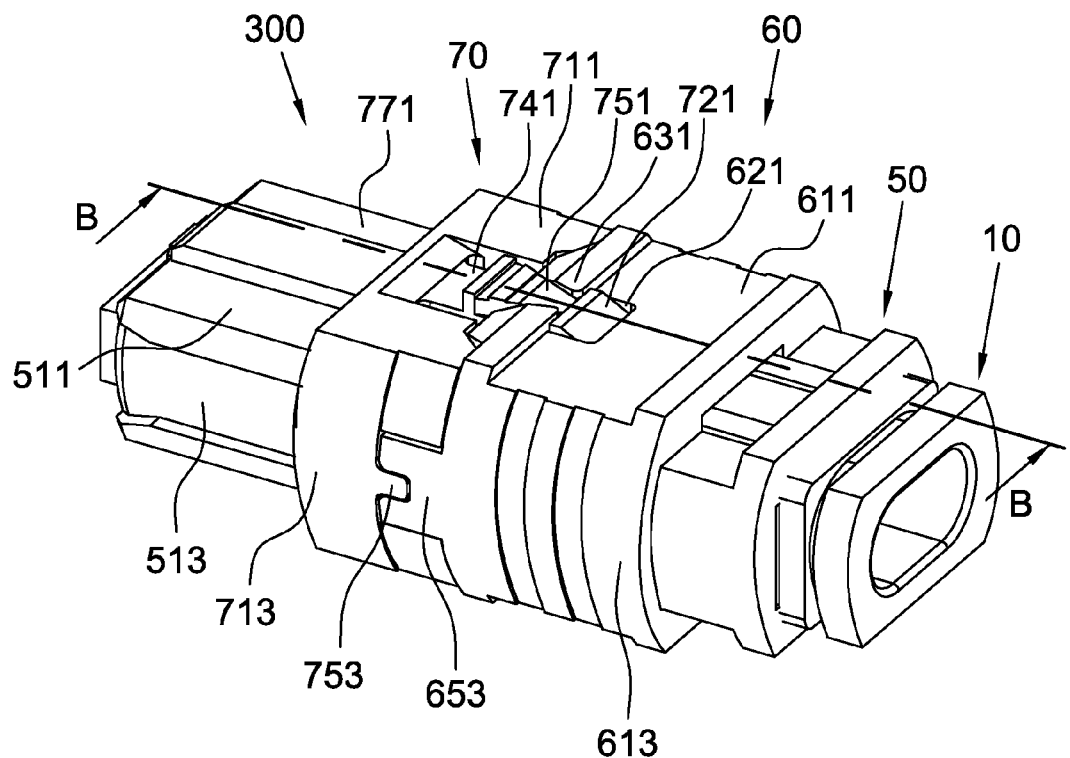
FIG. 13 is an elevated perspective view of the optical fiber connector according to one aspect of the present disclosure.
Figure 14:
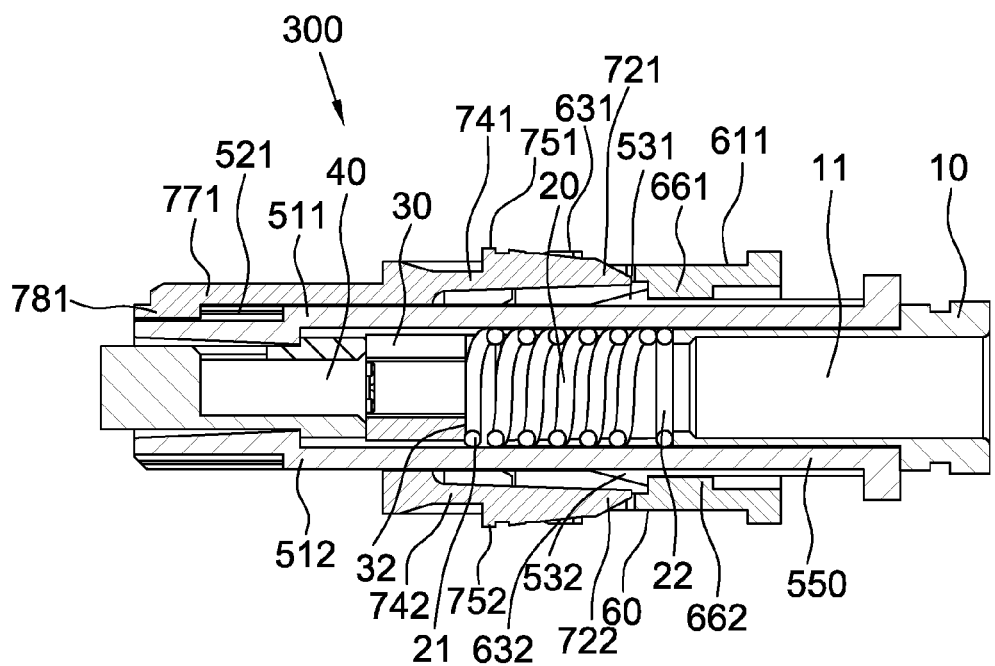
FIG. 14 is a cross-sectional view taken along line B-B of FIG. 13.

When the optical fiber connector of the present disclosure is assembled following the above given steps to form the optical fiber connector 300 of FIG. 13, the key arm 771 is arranged to be the key protrusion and therefore restrict the insertion of the optical fiber connector 300 into a counterpart adapter with only predetermined orientation. With the introduction of the optical fiber adapter 200 of FIG. 2 for illustration, the optical fiber connector 300 of FIG. 3 fails to be inserted into the optical fiber adapter 200 from one of the openings 210 when the key arm 771 is positioned up. When the optical fiber connector 300 of FIG. 3 is turned over such that the key arm 771 is positioned down, the key arm 771 may then be inserted into one of the key recesses 230 of the optical fiber adapter 200. Therefore, the optical fiber connector 300 may mate with the optical fiber adapter 200. This restricts the coupling of the optical fiber connector 300 and another optical fiber connector to the predetermined polarity.

Figure 15:
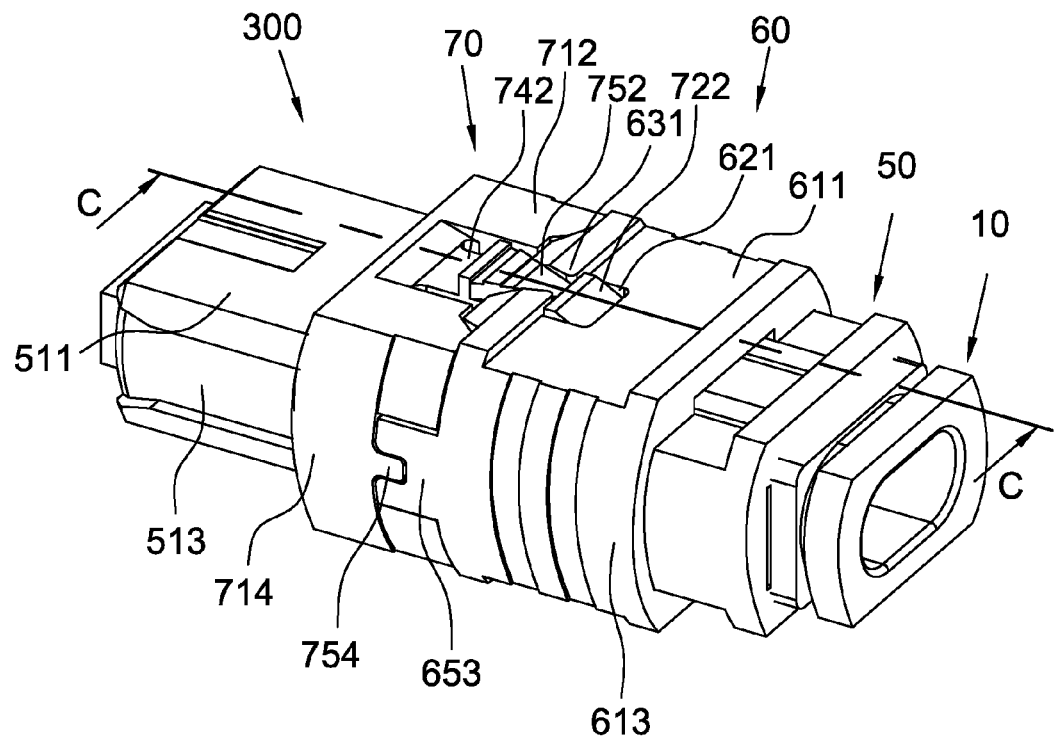
FIG. 15 is an elevated perspective view of the optical fiber connector according to another aspect of the present disclosure.
Figure 16:
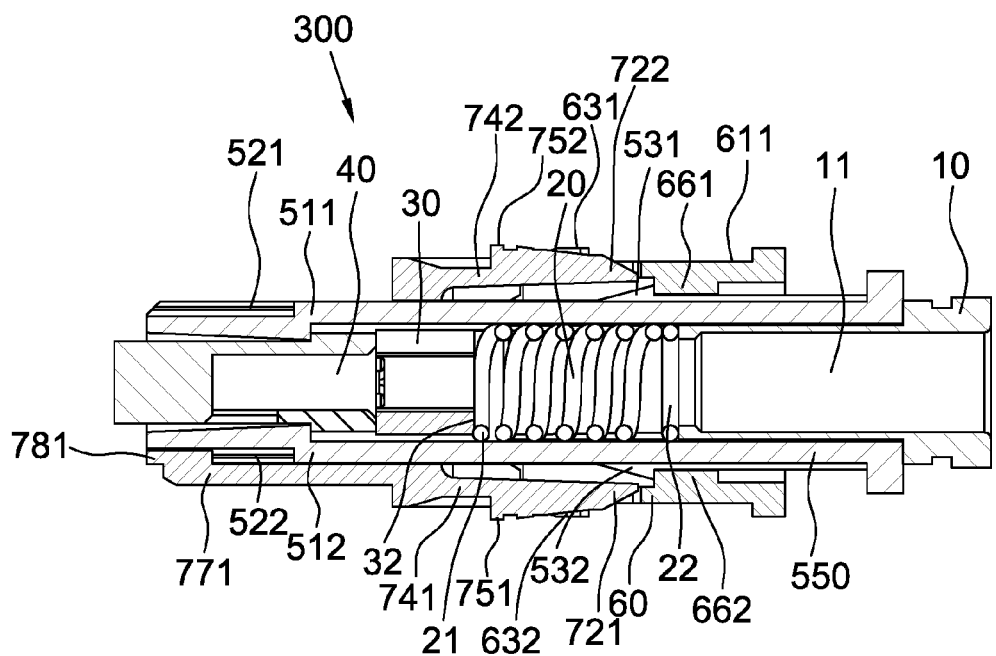
FIG. 16 is a cross-sectional view taken along line C-C of FIG. 15.

In order to switch or change the coupling polarity of the optical fiber connector 300, one may press down the press projections 751 and 752 of the second outer housing 70 and pull out the second outer housing 70. Afterward, the second outer housing 70 is turned over such that the key arm 771 is positioned down. The second outer housing 70 is then coupled to the first outer housing 60 to form the optical fiber connector 300 of FIG. 15. The way to form the optical fiber connector 300 of FIG. 15 may refer to the above assembling steps given to form the optical fiber connector 300 of FIG. 13. With reference to FIGS. 15 and 16, the engagement projections 721, 722 respectively fall into the accommodation openings 622, 621 and the engagement portions 753, 754 respectively engage the engagement portions 654, 653 when the second outer housing 70 is coupled to the first outer housing 60. In addition, parts of the press projections 751 and 752 of the second outer housing 70 are respectively positioned in the breaks 642 and 641. This means that the engagement portions 721, 722 have engaged the respective engagement portions 622, 621 and the engagement portions 753, 754 have engaged the respective engagement portions 654, 653. Furthermore, the restricting block 781 of the second outer housing 70 is inserted into the groove 522 on the inner housing 50 from its front edge so that the key arm 771 is positioned on the bottom wall 512 of the inner housing 50 and above the groove 522 to function as the key protrusion. Accordingly, the coupling polarity of the optical fiber connector 300 is switched.

In the optical fiber connector 300 of the present disclosure the restricting block 781 fails to be removed directly upward from the groove 521 or 522. This prevents the key arm 771 from being raised from the top wall 511 or bottom wall 512 of the inner housing 50. In addition, the stop blocks 531, 532 of the inner housing 50 are positioned to restrict the respective movement of the projections 661, 662 of the first outer housing 60 further toward the front end of the inner housing 50. This prevents the first outer housing 60 from being pulled out from the front end of the inner housing 50. The stop blocks 631, 632 of the first outer housing 60 are positioned to stop the respective movement of the engagement projections 721, 722 of the second outer housing 70 when the engagement projections 721, 722 respectively engage the engagement portions 621, 622. This prevents the engagement projections 721, 722 from being pulled out from the respective accommodation openings 621, 622 to separate the second outer housing 70 from the first outer housing 60. If one would like to switch the coupling polarity of the optical fiber connector 300, he may use his fingers to press down the press projections 751 and 752 to separate the second outer housing 70 from the first outer housing 60.

Although the present disclose has been explained in detailed with MPO type optical fiber connector, it will be appreciated that the optical fiber connector of the present disclosure may include other types of optical fiber connectors.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber connector for inserting into an optical fiber adapter with a key recess formed therein, the optical fiber connector comprising:
   a hollow inner housing having a first wall, a second wall, a third wall and a fourth wall, wherein the first wall faces the third wall and connects with the second and fourth walls;
   a first outer housing attached to the inner housing,
   a second outer housing detachably coupled to the first outer housing an detachably attached to the inner housing, the second outer housing comprising a key arm, wherein the second outer housing detachably attached to the inner housing by positioning the key arm selectively on the first wall or the third wall such that the key arm is inserted into the key recess when the inner housing is inserted into the optical fiber adapter;
   wherein the first and second outer housings are hollow and surround the inner housing,
   the first outer housing comprising:
      a fifth wall, a sixth wall, a seventh wall, and an eighth wall, the fifth wall facing the seventh wall and connecting with the sixth and eighth walls, and
   the second outer housing further comprising:
      a ninth wall, a tenth wall, an eleventh wall, and a twelfth wall, the ninth wall facing the eleventh wall and connecting with the tenth and twelfth walls, the key arm extending from the ninth wall, wherein the ninth wall is detachably positioned on the first wall or the third wall.

2. The optical fiber connector as claimed in claim 1, wherein a groove is formed on each of the first and third walls, the second outer housing further comprises a restricting block coupled to the key arm, the respective groove is configured to receive the restricting block and stop the restricting block from being raised from the first wall or the third wall.

3. The optical fiber connector as claimed in claim 1, wherein the first outer housing comprises a first engagement portion and a second engagement portion, the second outer housing further comprises a third engagement portion, the third engagement portion is configured to engage the first engagement portion or the second engagement portion.

4. The optical fiber connector as claimed in claim 1, wherein a first accommodation opening and a second accommodation opening are formed on the first outer housing, the second outer housing further comprises a first engagement arm and a first engagement projection coupled to the first engagement arm, the first engagement projection is configured to engage the first accommodation opening or the second accommodation opening.

5. The optical fiber connector as claimed in claim 4, wherein the second outer housing further comprises a second engagement arm and a second engagement projection coupled to the second engagement arm, the second engagement projection is configured to engage the first accommodation opening or the second accommodation opening.

6. The optical fiber connector as claimed in claim 1, wherein a first accommodation opening and a second accommodation openings are formed on the first outer housing, the second outer housing further comprises a first engagement arm, the first engagement projection coupled to the first engagement arm, the first engagement projection is configured to engage the first accommodation opening or the second accommodation opening.

7. The optical fiber connector as claimed in claim 6, wherein the second outer housing further comprises a second engagement arm and a second engagement projection coupled to the second engagement arm, the second engagement projection is configured to engage the first accommodation opening or the second accommodation opening.

8. The optical fiber connector as claimed in claim 7, wherein the first accommodation opening and the second accommodation opening are formed respectively on the fifth wall and the seventh wall, the first engagement arm and the second engagement arm extends respectively from the ninth wall and the eleventh wall.

9. The optical fiber connector as claimed in claim 5, wherein the second outer housing further comprises a first press projection coupled to the first engagement arm and a second press projection coupled to the second engagement arm, the first press projection and the second press projection are configured to be pressed to respectively have the first engagement arm and the second engagement arm bent toward the inner housing.

10. The optical fiber connector as claimed in claim 1, wherein the second outer housing comprises a first engagement portion and a second engagement portion, the first outer housing further comprises a third engagement portion, the third engagement portion is configured to engage the first engagement portion or the second engagement portion.

11. The optical fiber connector as claimed in claim 1, wherein the inner housing further comprises two stop blocks positioned respectively on the first wall and the third wall to restrict the movement of the first outer housing.

12. The optical fiber connector as claimed in claim 1, wherein the optical fiber connector is MPO type.

* * * * *